Patented Sept. 24, 1940

2,215,957

UNITED STATES PATENT OFFICE 2,215,957

METHOD FOR MANUFACTURE OF BAKED GOODS

Jacob Freilich, New York, and Charles N. Frey, Scarsdale, N. Y., assignors to Standard Brands Incorporated, New York, N. Y., a corporation of Delaware No Drawing. Application September 2, 1938, Serial No. 228,146

10 Claims. (Cl. 99—90)

The invention relates to a method for the manufacture of baked goods. More particularly, it pertains to the production of yeast leavened baked goods, and includes correlated improvements and discoveries whereby the qualities thereof are enhanced.

It is known that the effects of papain, a proteolytic enzyme, when present in the dough batch, may be overcome through the addition of a bromate. This has been demonstrated by preparing loaves containing papain with and without a bromate. A control loaf containing no papain and no bromate had a volume of 2050 cc., whereas a loaf (the loaves referred to herein have an approximate weight of one pound) containing 75 mg. of papain and no bromate had a volume of only 1370 cc. Further, loaves containing the same amount of papain and varying amounts of bromate showed the following volumes in cubic centimeters:

| | |
|---|---|
| 5 mg. | 1380 |
| 15 mg. | 1450 |
| 25 mg. | 1630 |
| 30 mg. | 1840 |
| 40 mg. | 1920 |
| 50 mg. | 2020 |
| 70 mg. | 1990 |
| 100 mg. | 1920 |

The volume, it will be observed, when using 100 mg. is decidedly lower than the control loaf or that containing 50 mg. of bromate. Moreover, the loaves with the higher bromate content were characterized by what we term an excess bromate effect. This effect is evidenced in the loaves by a poor or low volume, rounded corners, rough exterior, a tendency to form a peak on top, and a texture which is poor, heavy, lumpy and coarse.

It is an object of the present invention to provide a procedure in accordance with which the causes leading to the production of baked goods having low volume, poor shape and a heavy, lumpy coarse texture may be wholly or at least in a large measure overcome. In other words, a procedure is provided whereby the excess bromate effect is obviated or eliminated.

Another object of the invention is the provision of a method whereby the qualities of yeast leavened baked goods produced from a dough containing an oxidizing agent, especially a bromate, are improved, for example, volume, exterior, shape, appearance and texture.

A further object of the invention provides a method whereby baked goods of approved qualities may be produced from a dough containing a bromate by the straight dough procedure as well as by the sponge dough procedure.

A particular object of the invention is to provide a process for obtaining baked goods of improved qualities from a dough containing a bromate in relatively large amount, and which may be readily, effectively and economically carried out in either large or small baking establishments.

A specific object of the invention is the provision of a procedure for overcoming the so called excess bromate effect by fermenting the dough and then subjecting it to a remixing under definite conditions.

Other objects of the invention will in part be obvious and will in part appear hereinafter.

The invention accordingly comprises the several steps and the relation of one or more of such steps with respect to each of the others thereof, which will be exemplified in the method hereinafter disclosed, and the scope of the invention will be indicated in the claims.

The effect of the addition of increasing amounts of a bromate, as potassium bromate, to a dough batch on the volume of the loaves produced therefrom is shown by the following:

| | |
|---|---|
| Control (no bromate) cc. | 2140 |
| Bromate 4 mg. cc. | 1900 |
| Bromate 50 mg. cc. | 1790 |
| Bromate 100 mg. cc. | 1710 |
| Bromate 1000 mg. cc. | 1570 |

The dough time was two hours, pan proof time fifty minutes, and the pH value of the bread about 5.48. There was a sharp decrease in loaf volume accompanied by a marked increase in excess bromate effect up to the 100 mg. stage. Thereafter, the increases produced a smaller volume change than would be indicative from the quality of bromate used. The tests indicated that there was a considerable amount of undecomposed bromate in the loaves containing the larger amount, i. e., 1000 mg.

That the effect of the bromate and its decomposition is linked to the acid present or developed in the dough was shown by a series of tests in which the volume of loaves produced with 20 mg. of potassium bromate and under varying dough times, were determined. The following table illustrates the results obtained:

| Dough time, hours | Percent sugar | Pan proof time, minutes | Loaf volume, cc. | pH of bread |
|---|---|---|---|---|
| None | 5 | 87 | 2060 | 5.70 |
| ¼ | 5 | 76 | 2110 | 5.70 |
| ½ | 5 | 73 | 2190 | 5.70 |
| 1 | 5 | 61 | 2110 | 5.70 |
| 1½ | 5 | 55 | 2010 | 5.67 |
| 2 | 5 | 59 | 1880 | 5.62 |
| 3 | 5 | 50 | 1770 | 5.49 |
| 4 | 6 | 50 | 1740 | 5.41 |
| 5 | 7 | 59 | 1730 | 5.29 |
| 6 | 8 | 65 | 1680 | 5.26 |

The texture of the 0, ¼ and ½ hour loaves was immature; that of the one hour loaf practically normal, whereas the one and one-half hour and longer dough time loaves showed a definite excess bromate effect, which became progressively greater as the dough time increased. Moreover, there is thus shown that with increasing fermentation time and resulting increase in acidity there is a progressive decrease in loaf volume when 20 mg. of potassium bromate are present per pound loaf. It seems probable that the smaller change in volume in comparison with change in pH after three hours fermentation was due to the fact that the bromate had been practically all decomposed so that during the longer fermentation periods there was not any bromate with which the acid might react.

The production of a loaf of good volume with a short fermentation period, when using 20 mg. of bromate, indicated that the addition of an acid to a young dough might produce an excess bromate effect. Consequently tests were made in which differing amounts of hydrochloric acid were added to the dough batch. The dough contained per lb. loaf 20 mg. of potassium bromate; the dough time was thirty minutes, and pan proof time seventy minutes. The results obtained follow:

| n/10 HCl, cc. | Loaf volume, cc. | pH of bread |
|---|---|---|
| 0 | 2160 | 5.69 |
| 5 | 2180 | 5.60 |
| 10 | 2140 | 5.54 |
| 20 | 2070 | 5.41 |
| 30 | 2020 | 5.24 |
| 40 | 1900 | 5.11 |
| 50 | 1850 | 5.00 |

Texture of the loaves produced was satisfactory with the exception of the last three, and the loaf having a pH value of 5.11 was the first showing of a distinct excess bromate effect. It will be observed by reference to the preceding tabulation relating to varying dough times, that the excess bromate effect was first distinctly noticed at a pH value of 5.62. While there is a decided decrease in volume with increasing amounts of added acid in the young doughs, nevertheless these volumes are greater than those of the bread produced with longer dough times and having substantially the same pH value.

We have also found that carbon dioxide is a contributing factor in connection with the excess bromate effect. This was proved by a series of experiments in which acid was added to a dough containing 20 mg. of potassium bromate per lb. loaf, and the mixing carried out in carbon dioxide. The dough time was thirty minutes, pan proof seventy-five minutes. The following results were obtained.

| n/10 HCl, cc. | Loaf volume, cc. | pH of bread |
|---|---|---|
| Doughs mixed in CO₂: | | |
| 0 | 2070 | 5.66 |
| 5 | 2040 | 5.61 |
| 10 | 1960 | 5.54 |
| 20 | 1840 | 5.41 |
| 30 | 1790 | 5.28 |
| 40 | 1790 | 5.13 |
| 50 | 1740 | 5.01 |

First showing of a distinct excess bromate effect was in the loaf having a pH value of 5.41. The texture of the first two loaves was satisfactory. These tests indicate that changes in volume and particular characteristics were quite marked when the mixing was carried out in carbon dioxide.

We have thus shown that there are decided changes in volume when bromate is present in the dough, and especially with decreasing pH values whether arising from fermentation, added acid, or added acid and carbon dioxide. While the results of the tests using acid and carbon dioxide are substantially parallel to those obtained when the acid was produced through fermentation, they are not coincidental, thus indicating that additional factors may be involved.

These decreases in loaf volume accompanied by poor texture and exterior shape and appearance, referred to as excess bromate effect, may be overcome in the practice of the invention by forming a dough through admixture of flour, yeast, water and other dough ingredients, as sugar, salt, shortening, malt extract and powdered milk, which may include an oxidizing agent, for example, a bromate, an iodate, or a persalt, as a persulfate, fermenting the dough, and then remixing, followed subsequently by molding, proofing and baking. The mixing may be followed by a resting period of about fifteen to thirty minutes, a rounding of the dough and another resting period of fifteen minutes. Remixing following the fermentation period produces distinctive improvements in the volume and other qualities of the loaf. Accordingly, not only is the volume improved, but the texture, interior color, crust color, and exterior shape and appearance are improved, and a satisfactory product obtained. The changes in volume indicative of improvement in qualities of the finished loaf are shown by results hereinafter presented, relative to tests pertaining to doughs having different amounts of bromate, different fermentation periods, and a young dough containing added acid and a bromate and mixed in carbon dioxide. All of these doughs, following fermentation, were remixed, then molded, proofed and baked.

*Doughs with varying amounts of KBrO₃*

| Bromate, mg. | Loaf volume, cc. | Remixed after fermentation loaf volume, cc. |
|---|---|---|
| 0 | 1990 | 1980 |
| 5 | 1900 | 2160 |
| 10 | 1860 | 2160 |
| 20 | 1680 | 2250 |
| 40 | 1640 | 2210 |
| 60 | 1550 | 2120 |
| 100 | 1500 | 2150 |
| 250 | 1480 | 2170 |
| 500 | 1420 | 2150 |
| 1000 | 1420 | 2140 |

*Doughs with 20 mg. of KBrO₃ fermented 2 and 6 hours*

| Dough time, hrs. | | |
|---|---|---|
| 2 | 1880 | 2190 |
| 6 | 1680 | 2160 |

*Doughs with 20 mg. bromate, 20 cc. n/10 acid, mixed in $CO_2$—dough time—½ hr.*

| | |
|---|---|
| Not remixed | 1930 |
| Remixed after fermentation | 2150 |

The foregoing results show that a remixing of the doughs, after fermentation, in all instances fully offsets the excess bromate effect. It was observed, however, that a remixing of doughs containing larger amounts of a bromate occasioned a very sticky and stringy condition. Our further experiments demonstrated conclusively that the duration of remixing is a material factor. The table now presented gives the results of such tests, and indicates that a remixing period of from one to two minutes is important with the type and speed of remixing used. Doughs prepared from flour, water, yeast, sugar, salt and auxiliary ingredients including the amounts of bromate indicated were initially mixed for two minutes and remixed after fermentation for the times indicated. The doughs were mixed in a Hobart-Swanson mixer, having a speed of about 110 R. P. M. and had a dough time of two hours with a pan proof time of fifty to fifty-five minutes.

*Doughs with no bromate*

| Remixing time, minutes | Loaf volume, cc. | pH of bread |
|---|---|---|
| ½ | 1960 | 5.43 |
| 1 | 2030 | |
| 1½ | 2150 | 5.40 |
| 2 | 2130 | |
| 4 | 2160 | 5.38 |

*Doughs with 20 mg. of bromate*

| Remixing time, minutes | Loaf volume, cc. | pH of bread |
|---|---|---|
| ½ | 1720 | 5.43 |
| 1 | 2050 | |
| 1½ | 2190 | 5.41 |
| 2 | 2230 | |
| 4 | 2070 | 5.37 |

*Doughs with 100 mg. of bromate*

| Remixing time, minutes | Loaf volume, cc. | pH of bread |
|---|---|---|
| ½ | 1710 | 5.43 |
| 1 | 2140 | |
| 1½ | 2190 | 5.41 |
| 2 | 2100 | |
| 4 | 1770 | 5.37 |

It is apparent from results that the loaf volume is affected by the length of the remixing period, and that such period with a Hobart-Swanson mixer should not be longer than two minutes when a bromate is present in the dough. This period, however, will vary as the speed and type of the mixer, and will be prolonged as the speed decreases. An average commercial mixer may have a speed of 65 to 70 R. P. M. and will give a well mixed dough in eight to ten minutes, depending on constructional details, type of flour, size of dough, and other factors. In the Hobart-Swanson, when no bromate is present the desirable effects of remixing have been obtained after a period of about one and one-half minutes. The same result attends the use of bromate, but in such instances the remixing should not be continued desirably for more than two minutes since undue remixing produces a sticky, stringy dough, and poor bread of low volume and inferior texture and color. On the other hand, the doughs without bromate may be remixed for longer periods, but without effecting any decided improvement in qualities.

More particularly, and referring to the 20 mg. bromate tests, it will be noted that the differences were much greater than in the no bromate series, and also that whereas the one-half minute loaf showed a strong excess bromate effect, the one, one and one-half, and two minute loaves were about normal, although the grain was somewhat open, and the four minute loaf was inferior. The loaf with four minutes of remixing in the 100 mg. series was of very poor quality compared to the corresponding loaf in the 20 mg. series. Otherwise the loaves in the two series were quite similar.

Remixing of doughs containing all ingredients following fermenting produces a striking improvement in qualities of the baked goods, and the results, by way of summation, show that the improvement in volume is brought about by a remixing, using a Hobart-Swanson mixer, of from one to two minutes; that the optimum volume for the doughs containing bromate is greater than for doughs without bromate; that the initial volume of bromate doughs is lower than that of doughs without bromate; that change in volume per unit of mixing time increases according to the bromate content of the dough; that whereas no change in volume occurred after the optimum was reached in the doughs without bromate, doughs containing bromate showed a very considerable decrease; that the pH value varied according to the remixing time, and that the doughs containing bromate and remixed for four minutes were sticky and stringy and practically incapable of being handled. The remixing, it will be realized, is not to be construed as the finishing operation, i. e., resting, rounding, resting, molding and proofing, and baking.

The effect of oxygen during remixing after fermentation, was demonstrated with doughs containing 20 mg. of potassium bromate per lb. loaf. These doughs were mixed in air and then after fermentation remixed in nitrogen, in air and in oxygen. Remixing was for varying time intervals as stated; dough time was two hours and pan proof time fifty to fifty-five minutes.

*Doughs with 20 mg. bromate, remixed in nitrogen after fermentation*

| Remixing time, min. | Loaf volume, cc. | pH of bread |
|---|---|---|
| ½ | 1750 | 5.44 |
| 1 | 2040 | 5.43 |
| 1½ | 2250 | 5.43 |
| 2 | 2240 | 5.40 |
| 4 | 2220 | 5.40 |

*Doughs with 20 mg. bromate, remixed in air after fermentation*

| Remixing time, min. | Loaf volume, cc. | pH of bread |
|---|---|---|
| ½ | 1720 | 5.43 |
| 1 | 2050 |  |
| 1½ | 2190 | 5.41 |
| 2 | 2230 |  |
| 4 | 2070 | 5.37 |

*Doughs with 20 mg. of bromate, remixed in oxygen after fermentation*

| Remixing time, min. | Loaf volume, cc. | pH of bread |
|---|---|---|
| ½ | 1750 | 5.40 |
| 1 | 1990 | 5.39 |
| 1½ | 2210 | 5.37 |
| 2 | 2090 | 5.34 |
| 4 | 1790 | 5.30 |

When remixed in nitrogen the one-half minute loaf shows a strong excess bromate effect; the one minute loaf has improved qualities, and the one, one and one-half, two and four minute doughs are substantially normal. The air remix loaves are similar to the nitrogen loaves, but the one which was remixed for four minutes was subnormal. In the oxygen series the one-half, one, and one and one-half minute loaves are like unto the nitrogen loaves, but the two and four minute loaves are inferior.

It follows from these experiments that oxygen plays a distinct role in the volume decreases produced by remixing doughs with bromate beyond a certain point, and that the absence of oxygen practically eliminates this decrease. Further, a decrease in pH during the remixing was noted in all of the series, but the change when remixed in oxygen is greater than when remixed in nitrogen.

The loaves which were remixed for one, one and one-half and two minutes possessed a satisfactory volume of about 2200 cc. This satisfactory volume development appears regardless of the differing chemical treatments to which the doughs were subjected, and there is present also a marked change in volume when the remixing time is varied as little as thirty seconds. Since this is so, and especially while approaching the satisfactory or optimum volume, it is suggested that the increases produced by remixing are probably due in a large measure to a physical change, perhaps a change in hydration or other colloidal properties of the dough. Moreover, the decrease in volume beyond the optimum might be due to both a physical and a chemical change. That there is a chemical change is indicated by a difference in pH value.

By the foregoing procedure bread may be produced with utilization of the straight dough procedure, which is wholly comparable and as readily reproducible as that manufactured by the sponge dough procedure. Furthermore, with a sufficient amount of sugar in the dough the fermentation may be prolonged, and a bread of good quality produced through the means of remixing, following fermentation, for the proper time period. Additionally, a short time or "no dough time" product might be made which would resemble breads produced with the usual fermentation periods. This would be accomplished through the addition of acid to the dough and mixing in carbon dioxide.

The procedures herein described point out that the invention is characterized at least in part by the following showings, that acid and carbon dioxide are decisive factors in the effects which a bromate has upon the quality of the product obtained; that the poor results attending the use of larger amounts of bromate and by prolonged fermentation with smaller amounts of bromate can be eliminated by remixing the dough following fermentation; that variations in remixing time produce marked differences in the products with a satisfactory volume change resulting with a remixing time of from one to two minutes in the Hobart-Swanson; that unsatisfactory results obtained when remixing for longer periods of time are due to the incorporation of oxygen during remixing and that this may be rectified by remixing in the absence of oxygen, as by using an inert gas, e. g. nitrogen, and that a product having the qualities of that produced in the usual manner may be obtained from a short time or "no dough time" dough through an adding of oxidizing agent and acid thereto and a mixing in carbon dioxide. The proper remixing interval must be determined experimentally for each mixer under the particular conditions used; for a so-called "average" commercial mixer, it might be eight to ten minutes.

Since certain changes may be made in carrying out the above method without departing from the scope of the invention, it is intended that all matter contained in the above description shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described our invention, what we claim as new and desire to secure by Letters Patent is:

1. A process for the production of baked goods, which comprises preparing a dough by admixing a batch containing flour, water, yeast and other dough ingredients including an oxidizing agent, fermenting the dough, and then remixing.

2. A process for the production of baked goods, which comprises preparing a dough by admixing a batch containing flour, water, yeast and other dough ingredients including a bromate, fermenting the dough, and then remixing for a period of from one to two minutes.

3. A process for the production of baked goods, which comprises preparing a dough by admixing a batch containing flour, water, yeast and other dough ingredients including a bromate, fermenting the dough, and then remixing in the absence of oxygen.

4. A process for the production of baked goods, which comprises preparing a dough by admixing a batch containing flour, water, yeast and other dough ingredients including a bromate, fermenting the dough for a period upwards to six hours, and then remixing for a period of from one to two minutes.

5. A process for the production of baked goods, which comprises preparing a dough by admixing a batch containing flour, water, yeast and other dough ingredients including an added acid, fermenting the dough, and then remixing.

6. A process for the production of baked goods, which comprises preparing a dough by admixing a batch containing flour, water, yeast and other dough ingredients including an added acid, fermenting the dough, and then remixing in the absence of oxygen.

7. A process for the production of baked goods, which comprises preparing a dough by admixing a batch containing flour, water, yeast and other dough ingredients, fermenting the dough, then remixing for a period of from one to two minutes, and subsequently molding, proofing and baking.

8. A process for the production of baked goods, which comprises preparing a dough by mixing a batch containing flour, water, yeast and other dough ingredients in the presence of added carbon dioxide, fermenting the dough and then remixing.

9. A process for the production of baked goods, which comprises preparing a dough by mixing a batch containing flour, water, yeast and other dough ingredients including an oxidizing agent and an added acid in the presence of added carbon dioxide, fermenting the dough, and then remixing.

10. A process for the production of baked goods which comprises preparing a dough by admixing a batch containing flour, water, and yeast, fermenting the dough, then remixing, and subsequently molding, proofing and baking.

JACOB FREILICH.
CHARLES N. FREY.